US012654123B2

(12) United States Patent
Lee

(10) Patent No.: US 12,654,123 B2
(45) Date of Patent: *Jun. 16, 2026

(54) SYSTEM AND METHOD FOR HEATING AND COOLING AN INTERIOR ENVIRONMENT VIA PRESSURE SWING ABSORPTION

(71) Applicant: Aeolus Works LLC, Palo Alto, CA (US)

(72) Inventor: William Andrew Lee, Palo Alto, CA (US)

(73) Assignee: Aeolus Works LLC, Palo Alto, CA (US)

( * ) Notice: Subject to any disclaimer, the term of this patent is extended or adjusted under 35 U.S.C. 154(b) by 788 days.

This patent is subject to a terminal disclaimer.

(21) Appl. No.: 17/886,791

(22) Filed: Aug. 12, 2022

(65) Prior Publication Data

US 2022/0387925 A1    Dec. 8, 2022

Related U.S. Application Data

(63) Continuation-in-part of application No. 17/079,087, filed on Oct. 23, 2020, now Pat. No. 11,452,968.

(Continued)

(51) Int. Cl.
*B01D 53/14* (2006.01)

(52) U.S. Cl.
CPC ..... *B01D 53/1425* (2013.01); *B01D 53/1412* (2013.01); *B01D 53/1418* (2013.01); *B01D 53/1475* (2013.01); *B01D 2252/103* (2013.01)

(58) Field of Classification Search
None
See application file for complete search history.

(56) References Cited

U.S. PATENT DOCUMENTS 11,097,221 B2    8/2021  Lu et al.
11,452,968 B2 *  9/2022  Lee ................... B01D 53/1475
(Continued)

FOREIGN PATENT DOCUMENTS

WO      2016005226 A1     1/2016

OTHER PUBLICATIONS

International Search Report and Written Opinion for International Patent Application No. PCT/US2021/056511 mailed on Feb. 16, 2022; 9 pages.

(Continued)

*Primary Examiner* — Daniel Berns
(74) *Attorney, Agent, or Firm* — Run8 Patent Group, LLC; Peter Miller; Leah Raddatz

(57)      ABSTRACT

One variation of a method includes: conveying a mixture of air in a working fluid through a compressor to heat and pressurize the mixture to promote absorption of carbon dioxide into the working fluid; depositing the mixture in a high-pressure vessel configured to remove air from the mixture of carbon dioxide in the working fluid; conveying the mixture through a turbine to reduce pressure and promote desorption of carbon dioxide from the working fluid; depositing the mixture in a low-pressure vessel for removal of carbon dioxide; in response to a temperature of an interior environment falling below a target range, conveying the working fluid through a heating element configured to transfer heat from the working fluid into the interior environment; and, in response to the temperature exceeding the target range, conveying the working fluid through a cooling element configured to transfer heat from the working fluid into an exterior environment.

10 Claims, 3 Drawing Sheets

Related U.S. Application Data

(60) Provisional application No. 63/233,174, filed on Aug. 13, 2021, provisional application No. 62/925,721, filed on Oct. 24, 2019.

(56) References Cited

U.S. PATENT DOCUMENTS

| | | | |
|---|---|---|---|
| 11,571,657 B2 * | 2/2023 | Lee .................... | B01D 53/1425 |
| 12,036,506 B2 * | 7/2024 | Lee .................... | B01D 53/1475 |
| 2020/0048165 A1 | 2/2020 | Duggal et al. | |
| 2021/0121818 A1 | 4/2021 | Lee | |

OTHER PUBLICATIONS

IPCC Special Report on Carbon Dioxide Capture and Storage, Cambridge University Press 2005, Online 2005, 19 pages.

Notice of Allowance and Fees Due for U.S. Appl. No. 17/079,087 dated Apr. 20, 2022.

Notice of Allowance and Fees Due for U.S. Appl. No. 17/079,087 dated Mar. 22, 2022.

Notice of Allowance and Fees Due for U.S. Appl. No. 17/510,186 dated Sep. 30, 2022.

Office Action received in U.S. Appl. No. 17/510,186 dated Jun. 14, 2022.

Esrafilzadeh et al., Room temperature CO2 reduction to solid carbon species on liquid metals featuring atomically thin ceria interfaces, Nature Communications (2019).

Service, R., New way to turn carbon dioxide into coal could 'rewind the emissions clock' Liquid metal catalyst can convert carbon dioxide with just a trickle of electricity, Science, (Feb. 26, 2019).

* cited by examiner ("EXTERIOR INLET")

("INTERIOR INLET")

100

116

("EXTERIOR OUTLET")

118

("INTERIOR OUTLET")

182

190

180

170

("PUMP")

150

120

140

110

130

160

SYSTEM AND METHOD FOR HEATING AND COOLING AN INTERIOR ENVIRONMENT VIA PRESSURE SWING ABSORPTION

CROSS-REFERENCE TO RELATED APPLICATIONS

This application claims the benefit of U.S. Provisional Application No. 63/233,174, filed on 13 Aug. 2021, which is incorporated in its entirety by this reference.

This application is a continuation-in-part of U.S. patent application Ser. No. 17/079,087, filed on 23 Oct. 2020, which claims the benefit of U.S. Provisional Application No. 62/925,721, filed on 24 Oct. 2019, each of which is incorporated in its entirety by this reference.

TECHNICAL FIELD

This invention relates generally to the field of heat transfer and more specifically to a new and useful method for indoor heating and cooling in the field of heat transfer.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
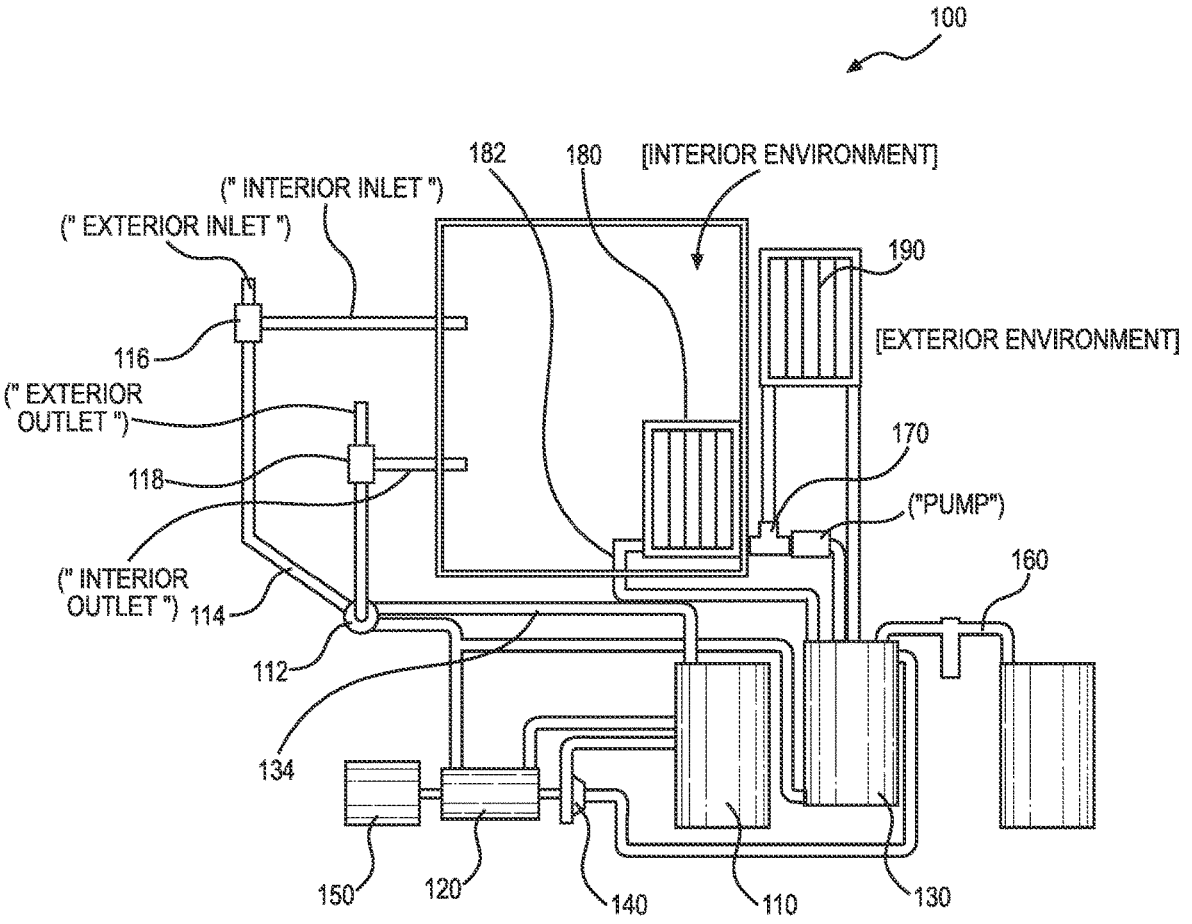
FIG. 1 is a schematic representation of a system.
Figure 2:
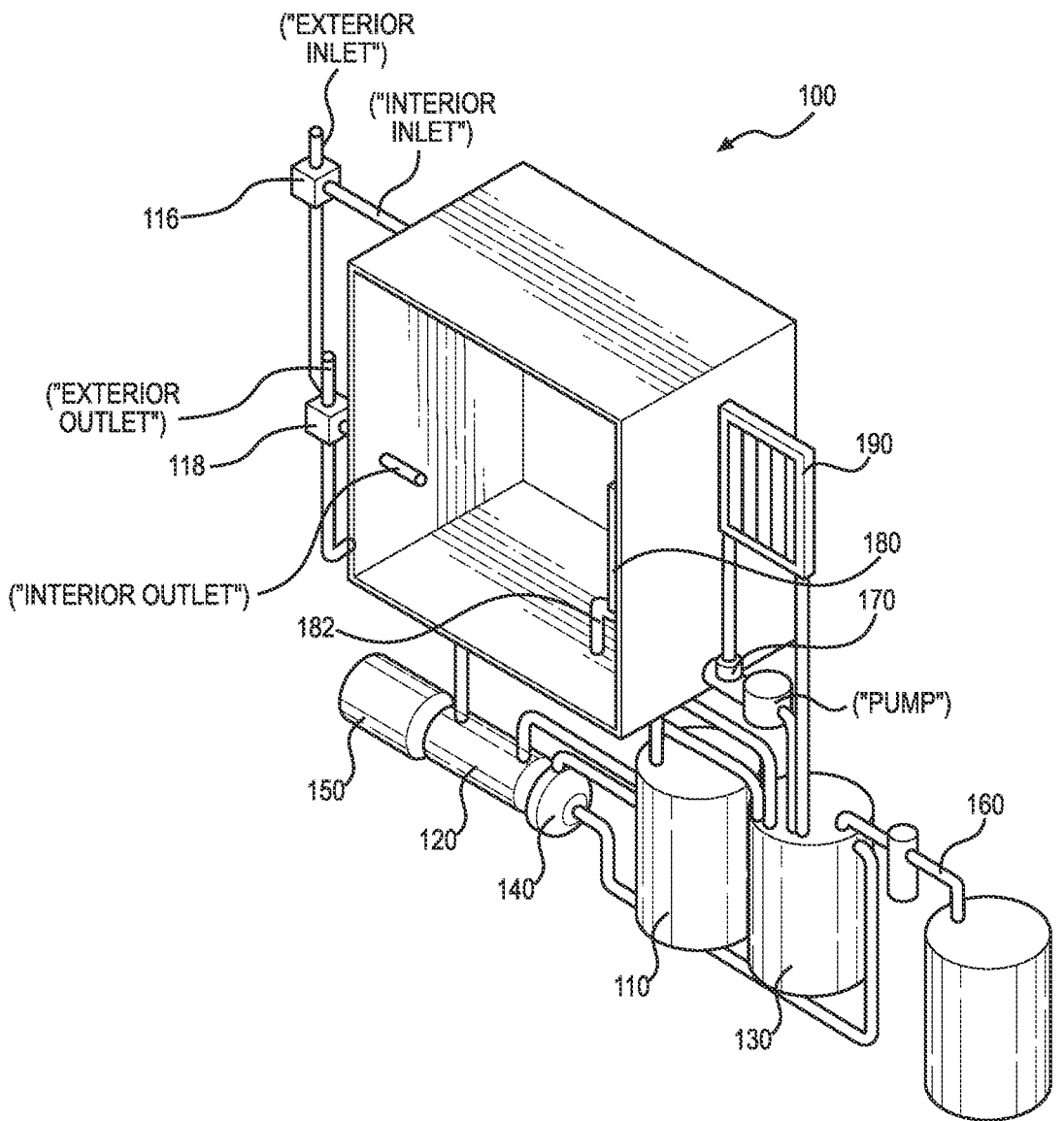
FIG. 2 is a schematic representation of the system.

As shown in FIGS. 1 and 2, a system 100 includes: an air inlet 114; a venturi 112; a compressor 120; a motor 150; a high-pressure vessel 110; an exhaust outlet 134; a turbine 140; a low-pressure vessel 130; a carbon dioxide outlet 160; a temperature control valve 170; a heating element 180; a cooling element 190; and a fluid return 182.

The air inlet 114 is configured to: ingest ambient air from an external environment; and direct ambient air toward the venturi 112.

The venturi 112 is coupled to the air inlet 114 and configured to mix ambient air with a working fluid—stored in the low-pressure vessel 130—to output a first mixture that includes: a volume of the working fluid; and a volume or air dispersed within the volume of the working fluid, the volume of air including carbon dioxide and a set of secondary gases.

The compressor 120 is: mechanically coupled to a driveshaft; configured to pressurize the first mixture from a first pressure within a first pressure range to a second pressure—within a second pressure range greater than the first pressure range—at an outlet of the compressor 120 to promote absorption of carbon dioxide in the volume of air into the volume of the working fluid; and configured to heat the first mixture from a first temperature within a first temperature range to a second temperature—in a second temperature range greater than the first temperature range—at the outlet of the compressor 120.

The motor 150 is: mechanically coupled to the driveshaft; configured to drive the compressor 120; and configured to output thermal energy (hereinafter "heat") transferable into the first mixture via the compressor 120.

The high-pressure vessel 110 is configured to: receive the first mixture, at the second pressure, from the compressor 120; and promote separation of the volume of the working fluid, including carbon dioxide, from the volume of air, including the set of secondary gases.

The exhaust outlet 134 is configured to collect an exhaust stream—including the set of secondary gases—from the high-pressure vessel 110.

The turbine 140 is mechanically coupled to the driveshaft and is configured to: receive a second mixture—including carbon dioxide dissolved in the volume of the working fluid—from the high-pressure vessel 110; reduce the second mixture exiting the high-pressure vessel 110 from the second pressure at a turbine inlet to the first pressure at a turbine outlet by extracting energy from the second mixture; promote desorption of carbon dioxide from the volume of working fluid; and transfer energy extracted from the second mixture into a torque on the driveshaft to rotate the compressor 120.

The low-pressure vessel 130 is configured to promote separation of carbon dioxide from the volume of working fluid in the second mixture.

The carbon dioxide outlet 160 is configured to collect carbon dioxide from the low-pressure vessel 130 for storage in a carbon dioxide storage vessel.

The working fluid outlet is configured to collect the working fluid from the low-pressure vessel 130.

The temperature control valve 170 is coupled to the working fluid outlet and configured to: receive the volume of working fluid from the low-pressure vessel 130 via the working fluid outlet; in a first position, direct the volume of working fluid toward the heating element 180; and, in a second position, direct the volume of working fluid toward the cooling element 190.

The heating element 180 is: fluidly coupled to the temperature control valve 170; and configured to periodically receive volumes of working fluid from the low-pressure vessel 130 for regulating a temperature of an interior environment up to within a target temperature range.

The cooling element 190 is: fluidly coupled to the low-pressure vessel 130; configured to periodically receive volumes of working fluid from the low-pressure vessel 130 for regulating the temperature of the interior environment down to within the target temperature range.

The fluid return 182 is configured to: collect working fluid from the low-pressure vessel 130; and direct working fluid toward the venturi 112.

In one variation, the system further includes an air-inlet valve 116 mechanically coupled to the air inlet 114—opposite the venturi 112—and configured to: in a first position, ingest air (e.g., atmospheric air) from an exterior environment, external the interior environment; and, in a second position, ingest air (e.g., ambient, indoor air) from the interior environment.

In one variation, the system further includes an exhaust outlet 134 valve mechanically coupled to the exhaust outlet 134—opposite the high-pressure vessel 110—and configured to: in a first position, release air, including the set of secondary gases, into the exterior environment; and, in a second position, release air into the interior environment.

2. Method

Figure 3:
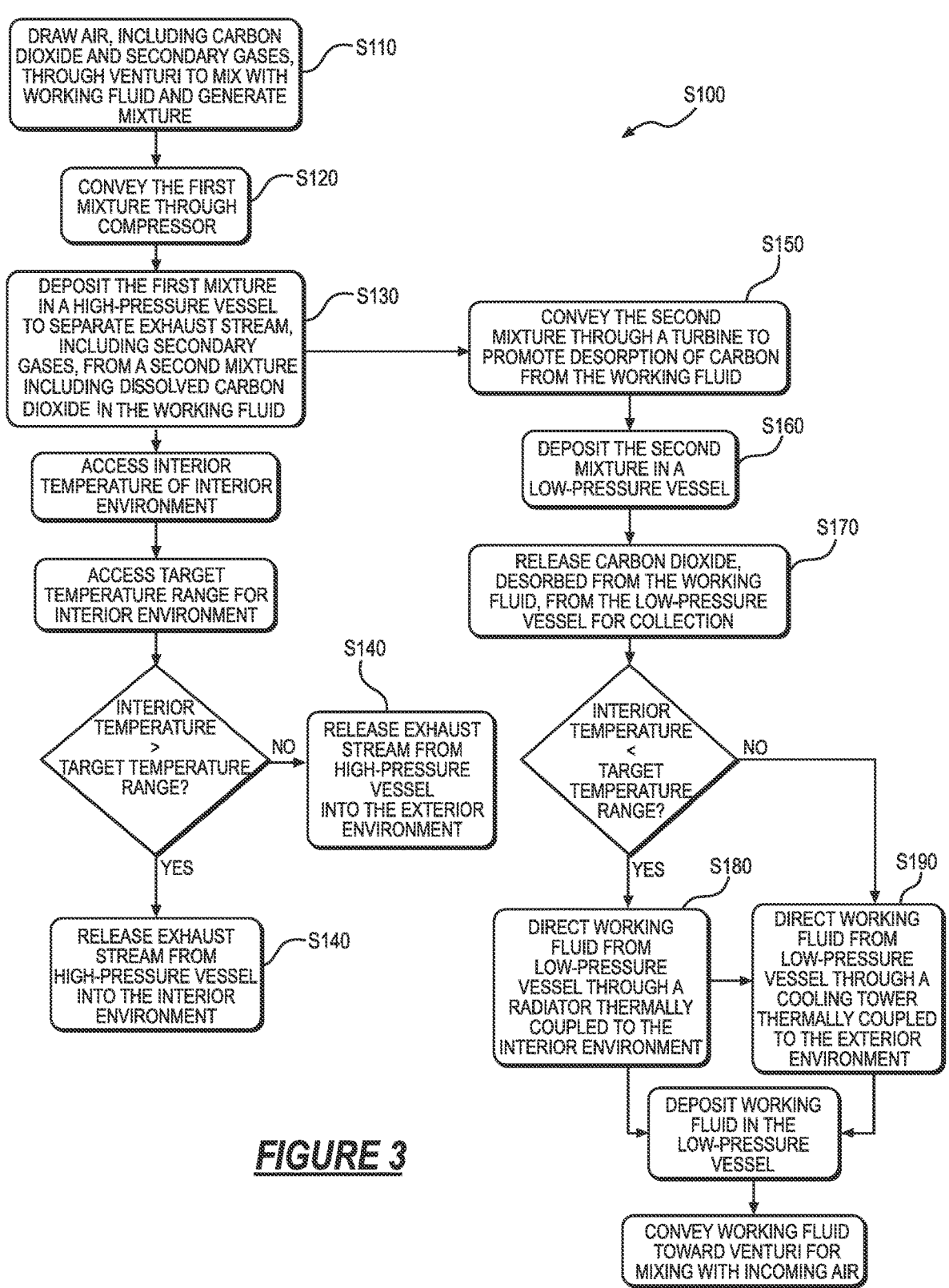
FIG. 3 is a flowchart representation of a method.

As shown in FIG. 3, a method S100 for regulating temperature of an interior environment includes: mixing ambient air with a working fluid to generate a first mixture including a volume of air dispersed throughout the working fluid in Block S110; conveying the first mixture through a compressor 120 configured to pressurize the first mixture from a first pressure within a first pressure range at an inlet of the compressor 120 to a second pressure within a second pressure range—greater than the first pressure range—at an outlet of the compressor 120 to promote absorption of carbon dioxide present in the volume of air into the working fluid and heat the volume of the working fluid via compression of the volume of air in Block S120; depositing the first mixture in a high-pressure vessel 110 to generate an exhaust stream including air and a second mixture including carbon dioxide dissolved in the working fluid in Block S130; releasing the exhaust stream from the high-pressure vessel 110 via an exhaust outlet 134 in Block S140; conveying the second mixture from the high-pressure vessel 110 through a turbine 140 configured to extract energy from the second mixture and reduce the pressure of the second mixture, from the second pressure at an inlet of the turbine 140 to the first pressure within the first pressure range at an outlet of the turbine 140, to promote desorption of carbon dioxide from the working fluid in Block S150; transferring the second mixture from the turbine 140 into a low-pressure vessel 130 in Block S160; and releasing carbon dioxide, desorbed from the working fluid, from the low-pressure vessel 130 for collection in Block S170.

The method S100 further includes: accessing an interior temperature of the interior environment; accessing a target temperature range of the interior environment; in response to the interior temperature falling below the target temperature range, conveying the working fluid through a heating element 180 configured to transfer heat from the working fluid into the interior environment in Block S180; and, in response to the interior temperature exceeding the target temperature range, conveying the working fluid through a cooling element 190 configured to transfer heat from the working fluid to an exterior environment isolated from the interior environment in Block S190.

3. Applications

Generally, as shown in FIGS. 1 and 2, the method S100 can be executed by a system 100: to directly capture an air stream including carbon dioxide and other secondary gases found in air (e.g., nitrogen, oxygen, argon) from an air source (e.g., outdoor air, recirculated air within a building); to entrain a working fluid stream with this air stream to generate a gas-liquid mixture; to process this gas-liquid mixture—according to various techniques and/or in combination with additional components—to separate carbon dioxide from the working fluid stream for collection; to heat the working fluid stream for heating and/or cooling an interior environment thermally and/or fluidly coupled to the system 100; and to circulate the working fluid stream accordingly to regulate a temperature of the interior environment to within a target temperature range.

In particular, the system 100 is configured to regulate air temperature in an interior environment by leveraging heat capacity of a working fluid (e.g., water) to: gradually heat this working fluid, as it circulates through the system 100, via absorption of heat from air and/or heat generated by moving parts (e.g., the motor 150) within the system 100; direct this heated working fluid through various heating element 180s (e.g., a radiator) thermally coupled to the interior environment to increase temperature within the interior environment; direct this heated working fluid through various cooling element 190s (e.g., a cooling tower) to remove heat from the working fluid and the system 100, thereby reducing temperature within the interior environment; and/or release compressed gas (e.g., compressed air) into the interior environment to reduce temperature within the interior environment.

For example, the system can be configured to: mix an air stream—including carbon dioxide and other secondary gases—with a working fluid stream to form an aspirated fluid stream; and compress this aspirated fluid stream in a multi-stage compressor 120, thereby pressurizing air in the aspirated fluid stream and generating heat within the multi-stage compressor 120. This multi-stage compressor 120 can be configured to isothermally compress gases (i.e., air) present in this aspirated fluid stream, such that the heat generated via compression of these gases in the multi-stage compressor 120 is rapidly (e.g., nearly instantaneously) transferred into the working fluid stream. Further, the system 100 includes a motor 150 mechanically coupled and configured to drive the compressor 120. By coupling the motor 150 to the compressor 120, the system enables transfer of heat—generated by actuation of the motor 150—from the motor 150 to the compressor 120, thereby enabling further transfer of heat into the working fluid stream in the compressor 120.

The system 100 can then transfer this aspirated fluid stream—including the heated working fluid stream and the air stream—from the compressor 120 into the high-pressure vessel 110 for separation of the air stream from the working fluid stream. In particular, the high-pressure vessel 110 can be configured to: separate and accumulate gases present in the aspirated fluid stream in an upper region of the high-pressure vessel 110; and accumulate the remaining working fluid—including dissolved carbon dioxide—in a lower region of the high-pressure vessel 110. The resulting exhaust stream (e.g., gaseous stream) can then be released from the high-pressure vessel 110 via an exhaust outlet 134 located in the upper region of the high-pressure vessel 110 for release into: an exterior environment (e.g., outside atmospheric air), such as during heating of the interior environment; or into the interior environment, such as to cool the interior environment via expansion of gases in this exhaust stream in the interior environment.

The system 100 can then: convey the collected working fluid stream through the turbine 140 to depressurize the working fluid stream and thus promote separation of carbon dioxide dissolved in the working fluid stream out of the working fluid stream; separate the gaseous carbon dioxide from the working fluid stream in the low-pressure vessel 130 for collection; and collect this gaseous carbon dioxide in the carbon dioxide storage tank via the carbon dioxide outlet 160. The resulting (heated) working fluid stream can then be circulated through: a radiator installed within the interior environment to heat the interior environment; or a cooling tower (or radiator) outside the interior environment (e.g., in the exterior environment) to cool the working fluid stream for recycling through the venturi 112 and further extracting of heat from air flowing through the system 100.

The system can therefore minimize emissions of greenhouse gases into the atmosphere by eliminating chlorofluorocarbons and/or hydrofluorocarbons (or other common greenhouse gas refrigerants) from the heating and cooling process and instead circulating a non-greenhouse gas working fluid—such as water—to heat and/or cool the interior environment.

In one implementation, the system 100 includes: a motor 150 external the low-pressure vessel 130 and mechanically coupled to a driveshaft; a compressor 120 mechanically coupled to the driveshaft; and a turbine 140 mechanically coupled to the driveshaft and fluidly coupled to the compressor 120. By mechanically coupling the compressor 120, the turbine 140, and the motor 150 to a singular driveshaft, the system 100 can include a singular moving (e.g., rotating) assembly, thereby limiting points of failure within the system 100. Further, the system 100 can leverage energy recaptured by the turbine 140 via expansion of fluids to apply a torque to the driveshaft and therefore rotate the compressor 120, thereby reducing total energy input to operate the system 100.

Furthermore, because the system 100 includes few moving parts and is scalable, the system 100 can be deployed to various locations to regulate air temperature in indoor environments and/or to capture carbon dioxide from air (e.g., atmospheric air) at these various locations. For example, the system 100 can be mounted to a building or structure in a particular location. The system 100 can then be thermally coupled to an interior environment (e.g., inside of the building or structure) of this building or structure for heating and/or cooling this interior environment according to a target temperature range for this interior environment. Additionally, the system 100 can be scaled to an appropriate size based on the location of deployment.

3.1 Applications: Carbon Dioxide Sequestration

Further, the system 100 is configured to capture carbon dioxide from air (e.g., atmospheric air, ambient air) by leveraging solubility of carbon dioxide in the working fluid (e.g., water) at different pressures, thereby further reducing presence of greenhouse gases in the atmosphere. In particular, the system 100 is configured to: concentrate carbon dioxide in the working fluid and separate out secondary gases at high pressures in a high-pressure vessel 110; and separate carbon dioxide from the working fluid at low pressures in a low-pressure vessel 130 (e.g., after secondary gases have been removed). Therefore, by oscillating the working fluid between two vessels (e.g., the high-pressure vessel 110 and the low-pressure vessel 130), the system 100 can leverage changes in pressure to control a carbon dioxide carrying capacity of the working fluid and thus control absorption and desorption of carbon dioxide form the working fluid.

In particular, the system can be configured to: mix an air stream including carbon dioxide and other secondary gases with a working fluid stream to form an aspirated fluid stream; compress this aspirated fluid stream to rapidly increase concentration of carbon dioxide dissolved in the working fluid stream via pressurization of the stream; separate the secondary gases from the working fluid stream including the dissolved carbon dioxide in the high-pressure vessel 110; expand the remaining working fluid stream and dissolved oxygen to rapidly decrease concentration of carbon dioxide dissolved in the working fluid stream via depressurization of the fluid stream; and separate the gaseous carbon dioxide from the working fluid stream in the low-pressure vessel 130. This gaseous carbon dioxide can then be collected and stored while the working fluid can be selectively directed to the heating or cooling element 190$s$ (e.g., to heat or cool the interior environment) and eventually recycled to continuously extract carbon dioxide from an inbound air stream. Alternatively, if the interior temperature of the interior environment is within the target temperature range, the system can automatically recycle the working fluid by directing the working fluid from the low pressure vessel back toward the venturi 112, and therefore continue capturing carbon dioxide from the inbound air stream while maintaining the current interior temperature of the interior environment.

4. HVAC

The system 100 can be mounted to (or within) a building or structure to regulate temperature within the interior environment of the building or structure.

In one implementation, the system 100 further includes: an air-inlet valve 116 mechanically coupled to the air inlet 114—opposite the venturi 112—and configured to ingest air from a surrounding environment (e.g., the exterior or interior environment) for passing through the air inlet 114 toward the venturi 112; and an exhaust outlet 134 valve mechanically coupled to the exhaust outlet 134—opposite the high-pressure vessel 110—and configured to release compressed air from the exhaust outlet 134 and into the surrounding environment. The air-inlet valve 116 can be configured to selectively ingest air from the exterior environment (e.g., outside of a building or structure) and/or from the interior environment (e.g., of a building or structure) based on a set of environmental controls (e.g., temperature, carbon dioxide level, humidity, pressure) within the interior environment. Similarly, the exhaust outlet 134 valve can be configured to selectively release compressed air in the high-pressure vessel 110 into the exterior environment and/or interior environment based on the set of environmental controls.

Further, in this implementation, the system 100 can include a temperature control valve 170 mechanically coupled to the working fluid outlet and configured to selectively direct the working fluid from the low-pressure vessel 130 toward the heating element 180 (e.g., a radiator) and/or toward the cooling element 190 based on temperature within the interior environment.

4.1 Working Fluid+Air

Block S110 of the method S100 recites: mixing ambient air including carbon dioxide and a set of secondary gases with a working fluid to generate a first mixture including a volume of air dispersed throughout the working fluid.

In particular, a volume of the working fluid can be entrained with a volume of ambient air, such that the resulting first mixture defines: a liquid phase including the volume of the working fluid; and a gaseous phase including the volume of air dispersed throughout the volume of the working fluid in the liquid phase.

In one implementation, air—including carbon dioxide and other secondary gases (e.g., nitrogen, argon)—is drawn in from an external source (e.g., a surrounding environment) via a venturi 112. The air travels through an air inlet 114 (e.g., an enclosed air inlet 114) extending from a surrounding environment (e.g., atmospheric air, ambient air) toward the venturi 112. Simultaneously, a working fluid is drawn into an opening from the low-pressure vessel 130 and through the venturi 112 where it is mixed with the air. When mixed, the air and the working fluid form a first mixture (e.g., a gas-liquid mixture) including: a liquid phase including the working fluid (e.g., a volume of water); and a gaseous phase including the air (e.g., a volume of air including carbon dioxide and other secondary gases), the gaseous phase dispersed throughout the liquid phase.

The working fluid can be selected based on absorbency of carbon dioxide and other secondary gases present in atmospheric air in the working fluid. For example, the working fluid can be configured to absorb carbon dioxide at higher pressures and to release carbon dioxide at lower pressures. Further, the working fluid can be configured to prioritize absorption of carbon dioxide over other secondary gases at particular pressures and temperatures, such that the working fluid selectively absorbs carbon dioxide and limits absorption of (e.g., does not absorb) secondary gases present in air. In one implementation, the working fluid can be water. In another implementation, to enable further absorption of carbon dioxide from the volume of air into the working fluid, the working fluid can be treated with solvents configured to increase carbon dioxide absorption. For example, the working fluid can include an amine solvent (e.g., an ethanolamine) dissolved in water.

4.1.1 Air Source: Environmental Control

In one implementation, the system can oscillate the air-inlet valve 116 to enable airflow from the exterior environment (e.g., outside of a building) and/or from the interior environment (e.g., inside of the building) through the venturi 112. In particular, the air-inlet valve 116 can be configured to oscillate between: a first position in which atmospheric air from the exterior environment is drawn through the air-inlet valve 116 toward the venturi 112; and a second position in which ambient air from the interior environment is drawn through the air-inlet valve 116 toward the venturi 112.

In this implementation, the system can selectively position the air-inlet valve 116 based on a set of environmental controls, such as: an interior temperature of the interior environment; an exterior temperature of the exterior environment; a target temperature range for the interior environment; a carbon dioxide level within the interior environment; a pressure level within the interior environment; and/or a humidity level within the interior environment.

For example, the system can include a set of temperature sensors configured to measure: an interior temperature of the interior environment; and an exterior temperature of the exterior environment. The system can also include a controller configured to read these temperatures from the set of temperature sensors and calculate a delta temperature between the exterior and interior environment based on these exterior and interior temperatures. In this example, at a first time, the controller can: access a current interior temperature of the interior environment measured by a first temperature sensor; access a target temperature range (e.g., between 70 degrees Fahrenheit and 72 degrees Fahrenheit) for the interior environment; and, in response to the current interior temperature falling outside the target temperature range, access a current exterior temperature of the exterior environment measured by a second temperature sensor. Then, the system can: calculate a first delta temperature as a difference between the current interior temperature and current exterior temperature. Then, in response to the difference falling below a threshold difference (e.g., 3 degrees, 5 degrees, 15 degrees), the controller can direct the air-inlet valve 116 to a first position, such that atmospheric air from the exterior environment is drawn through the air-inlet valve 116 and through the venturi 112. Alternatively, in response to the difference exceeding the threshold difference, the controller can direct the air-inlet valve 116 to a second position, such that ambient air from the interior environment is drawn through the air-inlet valve 116 and through the venturi 112. Therefore, in this example, when the temperature difference between the exterior temperature and the interior temperature is relatively low (e.g., below the threshold difference), the system can capture and pressurize atmospheric air from the exterior environment for heating and/or cooling the interior environment. Additionally, when the temperature difference is relatively high (e.g., above the threshold difference), the system can capture and pressurize ambient air from within the interior environment for heating and/or cooling the interior environment.

Further, in this example, the system can also monitor the carbon dioxide level within the interior environment. In particular, if the temperature difference between the interior environment and the exterior environment is relatively large (e.g., greater than 15 degrees), the system can position the air-inlet valve 116 in the second position to draw air from the interior environment through the venturi 112. However, over time, as ambient air is drawn through the venturi 112, and carbon dioxide is captured from this ambient air, the carbon dioxide level in the interior environment will decrease. Therefore, the system can include a carbon dioxide sensor configured to measure a carbon dioxide level (e.g., concentration) of the interior environment. The controller can: read the carbon dioxide level from this carbon dioxide sensor; access a target carbon dioxide level range for the interior environment. Then, in response to the carbon dioxide level falling below the target carbon dioxide range, the controller can reposition the air-inlet valve 116 in the first position to draw air from the exterior environment through the venturi 112, to regulate the carbon dioxide level within the interior environment to within the target carbon dioxide level range. In this example, the system can similarly include: a pressure sensor configured to measure an interior pressure level of the interior environment; and/or a humidity sensor configured to measure humidity of the interior environment. Additionally, the controller can: access a target pressure range; access a target humidity range; and control air flow through the air-inlet valve 116 to regulate pressure and/or humidity within the interior environment to within these target ranges.

4.2 Pressurizing the First Mixture

Block S120 of the method S100 recites conveying the first mixture through a compressor 120 configured to pressurize the first mixture from a first pressure within a first pressure range at an inlet of the compressor 120 to a second pressure within a second pressure range at an outlet of the compressor 120, the second pressure range greater than the first pressure range, to promote absorption of carbon dioxide present in the volume of air into the working fluid. In particular, the compressor 120 can be configured to receive the first mixture at a first pressure and output the first mixture at a second pressure greater than the first pressure. As pressure of the first mixture increases along the compressor 120, a capacity of the working fluid for absorbing carbon dioxide increases, thus enabling an increase in concentration of carbon dioxide in the working fluid in the liquid phase.

Further, the compressor 120 can be configured to generate heat via compression of the first mixture. In particular, as the first mixture increases in pressure within the compressor 120, heat is generated by the compressed gas (i.e., air) within the first mixture. This heat can then be rapidly transferred into the working fluid (e.g., water). In one implementation, the compressor 120 120 can be configured to isothermally compress air present in the first mixture, thereby increasing pump efficiency. For example, as gases (e.g., carbon dioxide, nitrogen, argon) present in air within the first mixture are compressed, temperatures of these gases increase. However, this generated heat can be transferred to the working fluid nearly instantaneously, such that the gases maintain approximately (e.g., within 2 degrees Celsius) constant temperatures.

The working fluid thus extracts heat from the compressed air within the first mixture. The system can then leverage this heat transfer from the air (e.g., ambient air from the interior environment or atmospheric air from the exterior environment) into the working fluid to heat and/or cool the interior environment.

4.3 Separation of Non-CO$_2$ Gases

Block S130 of the method S100 recites depositing the first mixture in a high-pressure vessel 110 110 to generate an exhaust stream including the set of secondary gases present in the volume of air and a second mixture including carbon dioxide dissolved in the working fluid. In particular, the high-pressure vessel 110 110 can be fluidly coupled to the compressor 120 120 such that the compressor 120 120 transfers the first mixture into the high-pressure vessel 110 110 at elevated pressures due to compression of the first mixture by the compressor 120 120. The high-pressure vessel 110 110 can be configured to maintain these elevated pressures and/or to further increase pressure of the first mixture within the high-pressure vessel 110 110.

The high-pressure vessel 110 can include: an exhaust outlet 134 (e.g., arranged in an upper region of the high-pressure vessel 110) through which air—including secondary gases—can exit the high-pressure vessel 110; and a fluid outlet (e.g., arranged in a lower region of the high-pressure vessel 110) through which the working fluid—including dissolved carbon dioxide—can exit the high-pressure vessel 110.

4.3.1 Air Release

In one implementation, the system can oscillate the air-outlet valve 118 to direct release of air—including the set of secondary gases—from the high-pressure vessel 110 and into the exterior environment and/or interior environment. In particular, the air-outlet valve 118 can be configured to oscillate between: a first position in which exhaust gas (e.g., air) from the high-pressure vessel 110 is released into the exterior environment; and a second position in which exhaust gas from the high-pressure vessel 110 is released into the interior environment.

In this implementation, the system can selectively position the air-outlet valve 118 based on the set of environmental controls, such as: an interior temperature of the interior environment; a target temperature range for the interior environment; a carbon dioxide level within the interior environment; a pressure level within the interior environment; and/or a humidity level within the interior environment.

For example, the system can include the set of temperature sensors and the controller as described above. In this example, the controller can: access a current interior temperature of the interior environment measured by a first temperature sensor; access a target temperature range for the interior environment; and, in response to the current interior temperature falling below the target temperature range, direct the air-outlet valve 118 to the first position to release pressurized air into the exterior environment and enable heating of the interior environment via circulation of the working fluid through the heating element 180 (e.g., a radiator within the interior environment). Alternatively, in response to the current interior temperature falling above the target temperature range, direct the air-outlet valve 118 to the second position to release pressurized air into the interior environment and therefore cool the interior environment via expansion of the compressed air within the interior environment.

4.4 Carbon Dioxide Separation

Block S150 of the method S100 recites conveying the second mixture from the high-pressure vessel 110 through a turbine 140 configured to extract energy from the second mixture and reduce the pressure of the second mixture, from the second pressure at an inlet of the turbine 140 to the first pressure within the first pressure range at an outlet of the turbine 140, to promote desorption of carbon dioxide from the working fluid. In particular, the system 100 can include the turbine 140 (e.g., a Francis turbine 140) configured to receive the second mixture at a first pressure and output the second mixture at a second pressure less than the first pressure. As pressure of the second mixture decreases along the turbine 140, the capacity of the working fluid for absorbing carbon dioxide decreases, thus enabling separation of carbon dioxide from the working fluid in the liquid phase.

The turbine 140—mechanically coupled to the compressor 120 via the driveshaft—can be configured to recover and recycle energy lost in the compressor 120. For example, as pressure builds up in the high-pressure vessel 110 over time, the turbine 140—thermally coupled to the high-pressure vessel 110—heats up and eventually reaches a steady state. Once the turbine 140 reaches this steady state, any excess energy harnessed from running the second mixture through the turbine 140 can be leveraged to power the compressor 120. Therefore, the energy input by the motor 150 in order to power the compressor 120 will decrease over time as the turbine 140 approaches steady state, thus decreasing power required to maintain operation of the system 100 and decreasing operating costs.

Further, Block S160 of the method S100 recites transferring the second mixture from the turbine 140 into the low-pressure vessel 130. In particular, once the second mixture exits the turbine 140, the second mixture can be released into the low-pressure vessel 130 at reduced pressures. The low-pressure vessel 130 can be configured to maintain these reduced pressures and/or to further reduce pressure of the second mixture within the low-pressure vessel 130. At these reduced pressures, the carbon dioxide separates from the working fluid in the liquid phase to generate carbon dioxide gas distinct from the working fluid.

The low-pressure vessel 130 can include a collection outlet through which gaseous carbon dioxide, separated from the working fluid—can exit the low-pressure vessel 130. This carbon dioxide released from the collection outlet can be collected (e.g., bottled) and stored. Once the carbon dioxide is removed from the low-pressure vessel 130, the clean working fluid can be: conveyed through the heating element 180 to heat the interior environment; conveyed through the cooling element 190 to enable cooling of the interior environment; and/or recycled back through the system 100 for continuous removal of carbon dioxide from atmospheric air.

4.5 Heating & Cooling: Working Fluid Distribution

The system can convey the heated, working fluid from the high-pressure vessel 110 toward: the heating element 180 to heat the interior environment; the cooling element 190 to enable cooling of the interior environment and extract heat from the working fluid; and/or back through the venturi 112 to continue extracting carbon dioxide from air while maintaining a current temperature of the interior environment.

For example, the system and/or controller can: access a current interior temperature of the space (e.g., measured by a temperature sensor); and access a target interior temperature range designated for the interior environment. Then, in response to the interior temperature falling below the target temperature range, the system and/or controller can: position the temperature valve in a first position to enable flow from the low-pressure vessel 130 toward the heating element 180 in the interior environment; and direct the heated working fluid through the heating element 180 to increase the current interior temperature by releasing heat from the working fluid into the interior environment. However, in response to the interior temperature exceeding the target temperature range, the system can: position the temperature valve in a second position to enable flow from the low-pressure vessel 130 toward the cooling element 190; and direct the heated working fluid through the cooling element 190 to cool the working fluid by releasing heat from the working fluid into the atmosphere. Further, in response to the interior temperature falling within the target temperature range, the system can: close the temperature valve; and direct the working fluid from the low-pressure vessel 130 toward the venturi 112 for mixing with incoming ambient or atmospheric air.

In this example, after the working fluid is circulated through the heating or cooling element 190s, the system can: return the working fluid to the low-pressure vessel 130 for storage; and recycle the working fluid back toward the venturi 112 for continuous or semi-continuous mixing with incoming ambient or atmospheric air. The system can therefore continue to regulate the interior temperature within the interior environment by: heating this working fluid via compression of air in the compressor 120; releasing heat from the working fluid into the interior environment (e.g., via the heating element 18o) to heat the interior environment and/or releasing heat from the working fluid into the exterior environment (e.g., via the cooling element 190) to cool the interior environment; and recycle back through the venturi 112 for continuous mixing with air.

5. Modes

The system can be configured to both heat and cool an interior environment (e.g., inside of a building) by entraining a working fluid with air (e.g., ambient or atmospheric air) ingested from a surrounding environment. In one implementation, the system can be configured to draw air from an exterior environment (e.g., atmospheric air)—separated from the interior environment—to mix with the working fluid in the venturi 112. Additionally and/or alternatively, in another implementation, the system can be configured to draw air from within the interior environment to mix with the working fluid in the venturi 112. Additionally, in each of these implementations, the system can be configured to release pressurized air, from the high-pressure vessel 110, into the exterior environment and/or the interior environment.

For example, the system can define a set of operating modes. The system can be configured to selectively activate (or switch between) different operating modes, in the set of operating modes, based on environmental conditions (e.g., temperature) of the interior environment and/or the exterior environment. In this example, the system can define: a first mode in which the system pressurizes air drawn from an exterior environment (e.g., outside of a building) to heat the working fluid and thereby the interior environment via circulation of the heated working fluid through an interior heating element 180 (e.g., a radiator); a second mode in which the system pressurizes air drawn from the interior environment to heat the working fluid and thereby the interior environment; a third mode in which the system pressurizes air drawn from the exterior environment and cools the interior environment; a fourth mode in which the system pressurizes air drawn from the interior environment and cools the interior environment; and a fifth mode in which the system is decoupled from the interior environment.

The system can actuate the set of valves (e.g., air-inlet valve 116, air outlet valve 118, temperature valve) to activate various operating modes and therefore regulate a set of environmental controls, such as temperature, pressure, humidity, and carbon dioxide concentration within the interior environment.

In one implementation, the system can include a set of sensors configured to monitor these environmental controls in the interior environment. For example, the system can include: a first sensor configured to measure a current temperature of ambient air in the interior environment; a second sensor configured to measure a current carbon dioxide concentration in ambient air in the interior environment; a third sensor configured to measure a current humidity level (e.g., absolute, relative, or specific humidity); and/or a fourth sensor configured to measure a current air pressure within the interior environment. The system can therefore: read current measurements (e.g., via the controller) for these environmental controls from the set of sensors; access target ranges of these environmental controls (e.g., defined by a user associated with the interior environment); and activate and/or switch between operating modes to regulate the current measurements for these environmental controls to within the target ranges defined for each environmental control.

5.1 External Air Source+Heating

In one implementation, the system can be configured to draw air from an exterior environment (e.g., exterior the interior environment) for mixing with the working fluid to heat the interior environment in a first heating mode.

In particular, in this implementation, the system can operate in the first heating mode to: draw air from the exterior environment (e.g., via the inlet valve) through a venturi 112 for mixing with a working fluid to generate a first mixture; convey the first mixture through a compressor 120 configured to pressurize the first mixture and thereby increase a temperature of the first mixture as pressure increases; and convey the first mixture from an outlet of the compressor 120 to the high-pressure vessel 110 for separation of the air from the working fluid.

The system can then: convey the heated working fluid from the high-pressure vessel 110 through the turbine 140 configured to extract energy from the working fluid and reduce the pressure of the working fluid to promote desorption of carbon dioxide from the working fluid; transfer the working fluid from the turbine 140 into the low-pressure vessel 130 for separation of carbon dioxide desorbed from the working fluid; and circulate the heated working fluid through an interior radiator installed within the interior environment to release heat from the working fluid into the internal environment, such as by directing the working fluid toward the interior radiator via the temperature valve. The system can then return the working fluid into the low-pressure vessel 130 for storage. The working fluid can then be collected from the low-pressure vessel 130 and recycled back through the venturi 112 for mixing with air to continue heating the interior environment.

Simultaneously, the system can release the air—separated from the working fluid in the high-pressure vessel 110—from within the high-pressure vessel 110 and into the exterior environment and/or the interior environment. In particular, the system can include an outlet valve 118 configured to direct air through: an exterior outlet configured to release air into the exterior environment; and/or an interior outlet configured to release air into the interior environment.

In one example, by ingesting air from the exterior environment, cycling the working fluid through the heating element 180, and releasing air via the exterior outlet into the exterior environment, the system can: increase an interior temperature within the interior environment; maintain a current carbon dioxide level in the interior environment; maintain a current pressure level in the interior environment; and maintain a current humidity level in the interior environment.

Alternatively, in another example, by ingesting air from the exterior environment, cycling the working fluid through the heating element 180, and releasing air via the interior outlet into the interior environment, the system can: increase the interior temperature within the interior environment; reduce a current carbon dioxide level within the interior environment by diluting ambient air in the interior environment with pressurized air—including a relatively low concentration of carbon dioxide—exiting the interior outlet; increase the current pressure level in the interior environment by releasing pressurized air into the interior environment; and increase a current humidity level in the interior environment.

5.2 Internal Air Source+Heating

Additionally and/or alternatively, in another implementation, the system can be configured to draw air from an interior environment (e.g., inside of a building or structure) for mixing with the working fluid to heat the interior environment in a second heating mode.

In particular, in this implementation, the system can operate in the second heating mode to: draw air from the interior environment (e.g., via the air-inlet valve 116) through the venturi 112 for mixing with the working fluid to generate the first mixture; convey the first mixture through the compressor 120 to pressurize the first mixture and thereby increase a temperature of the first mixture; and convey the first mixture from an outlet of the compressor 120 to the high-pressure vessel 110 for separation of the air from the working fluid.

The system can then continue processing the working fluid, as described above, to remove carbon dioxide from the working fluid and heat the interior environment via cycling of the working fluid through the heating element 18*o*.

Simultaneously, the system can release the air—separated from the working fluid in the high-pressure vessel 110—from within the high-pressure vessel 110 and into the exterior environment and/or the interior environment, as described above.

In one example, by ingesting air from the interior environment, cycling the working fluid through the heating element 180, and releasing air via the exterior outlet into the exterior environment, the system can: increase an interior temperature within the interior environment; reduce a current carbon dioxide level in the interior environment by removing carbon dioxide in ambient air from the interior environment; reduce a current pressure level in the interior environment by removing ambient air from within the interior environment; and reduce a current humidity level in the interior environment by removing moisture in ambient air in the interior environment.

Alternatively, in another example, by ingesting air from the interior environment, cycling the working fluid through the heating element 180, and releasing air via the interior outlet into the interior environment, the system can: increase the interior temperature within the interior environment; reduce a current carbon dioxide level within the interior environment by replacing ambient air in the interior environment with pressurized air—including a relatively low concentration of carbon dioxide—exiting the interior outlet; maintain the current pressure level in the interior environment; and reduce a current humidity level in the interior environment by removing moisture in ambient air in the interior environment and replacing this ambient air with dry, pressurized air.

5.3 External Air Source+Cooling

Additionally and/or alternatively, in another implementation, the system can be configured to draw air from the exterior environment (e.g., exterior the interior environment) for mixing with the working fluid to cool the interior environment in a first cooling mode.

In particular, in this implementation, the system can operate in the first cooling mode to: draw air from the exterior environment (e.g., via the inlet valve) through the venturi 112 for mixing with the working fluid to generate the first mixture; convey the first mixture through the compressor 120 configured to pressurize the first mixture and thereby increase a temperature of the first mixture as pressure increases; and convey the first mixture from the outlet of the compressor 120 to the high-pressure vessel 110 for separation of the air from the working fluid.

The system can then release the compressed air—separated from the working fluid in the high-pressure vessel 110—from within the high-pressure vessel 110 and into the interior environment via the interior outlet. As the compressed air is released into the interior environment, the compressed air expands within the interior environment, thereby cooling (e.g., reducing the interior temperature of) the interior environment. Alternatively, the system can release the compressed air into the exterior environment via the exterior outlet to extract heat from ambient air in the interior environment and therefore cool the interior environment.

Simultaneously, the system can then continue processing the working fluid, as described above, to remove carbon dioxide from the working fluid via the turbine 140 and the low-pressure vessel 130. The resulting, heated working fluid can then be circulated through the cooling element 190 (e.g., a cooling tower mounted to a building) to extract heat from the working fluid without transferring this extracted heat into the interior environment, such as by directing the working fluid toward the cooling element 190 via the temperature valve. The system can then return the cooled working fluid into the low-pressure vessel 130. The cooled working fluid can then be collected from the low-pressure vessel 130 and recycled back through the venturi 112 for mixing with atmospheric air to continue cooling the interior environment.

In one example, by ingesting air from the exterior environment, cycling the working fluid through the cooling element 190, and releasing air via the interior outlet into the interior environment, the system can: decrease an interior temperature within the interior environment; reduce a current carbon dioxide level within the interior environment by diluting ambient air in the interior environment with pressurized air— including a relatively low concentration of carbon dioxide—exiting the interior outlet; increase a current pressure level in the interior environment by releasing pressurized air into the interior environment; and/or increase a current humidity level in the interior environment by increasing moisture (e.g., present in atmospheric air) in ambient air in the interior environment over time.

Alternatively, in another example, by ingesting air from the exterior environment, cycling the working fluid through the cooling element 190, and releasing air via the exterior outlet into the exterior environment, the system can: decrease an interior temperature within the interior environment; maintain a current carbon dioxide level in the interior environment; and/or maintain a current pressure level in the interior environment; and maintain a current humidity level in the interior environment.

5.4 Internal Air Source+Cooling

Additionally and/or alternatively, in another implementation, the system can be configured to draw air from the interior environment for mixing with the working fluid to cool the interior environment in a second cooling mode.

In particular, in this implementation, the system can operate in the second cooling mode to draw air from the interior environment—via the air-inlet valve 116— through the venturi 112 for mixing with the working fluid to generate the first mixture; and process the first mixture as described above to pressurize the first mixture and separate compressed air from the working fluid—including dissolved carbon dioxide—within the high-pressure vessel 110.

The system can then release the compressed air from within the high-pressure vessel 110 and into the interior environment via the interior outlet, therefore cooling the interior environment via expansion of the compressed air. Alternatively, the system can release the compressed air into the exterior environment via the exterior outlet to extract heat from ambient air in the interior environment and therefore cool the interior environment.

Simultaneously, as described above, the system can continue processing the working fluid to: remove carbon dioxide from the working fluid via the turbine 140 and the low-pressure vessel 130; circulate the working fluid through the cooling element 190; return the cooled working fluid into the low-pressure vessel 130; and recycle the cooled working fluid from the low-pressure vessel 130 back through the venturi 112 for mixing with ambient air to continue cooling the interior environment.

In one example, by ingesting air from the interior environment, cycling the working fluid through the cooling element 190, and releasing air via the interior outlet into the interior environment, the system can: decrease an interior temperature within the interior environment; reduce a current carbon dioxide level within the interior environment by removing ambient air—including a first concentration of carbon dioxide— from the interior environment and introducing pressurized air—including a second concentration of carbon dioxide less than the first concentration—into the interior outlet; increase a current pressure level in the interior environment by releasing pressurized air into the interior environment; and/or maintain a current humidity level in the interior environment.

Alternatively, in another example, by ingesting air from the interior environment, cycling the working fluid through the cooling element 190, and releasing air via the exterior outlet into the exterior environment, the system can: decrease an interior temperature within the interior environment; reduce a current carbon dioxide level in the interior environment by removing ambient air including carbon dioxide from the interior environment; reduce a current pressure level in the interior environment; and/or reduce a current humidity level in the interior environment by removing moisture in ambient air in the interior environment.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for regulating temperature of an interior environment comprises:

mixing ambient air with a working fluid to generate a first mixture comprising a volume of air dispersed throughout the working fluid;

conveying the first mixture through a compressor configured to pressurize the first mixture from a first pressure within a first pressure range at a compressor inlet to a second pressure within a second pressure range, greater than the first pressure range, at a compressor outlet to promote absorption of carbon dioxide present in the volume of air into the working fluid and heat the volume of the working fluid via compression of the volume of air;

depositing the first mixture in a high-pressure vessel to generate an exhaust stream comprising air and a second mixture comprising carbon dioxide dissolved in the working fluid;

releasing the exhaust stream from the high-pressure vessel via an exhaust outlet;

conveying the second mixture from the high-pressure vessel through a turbine configured to extract energy from the second mixture and reduce the pressure of the second mixture, from the second pressure at an inlet of the turbine to the first pressure within the first pressure range at an outlet of the turbine, to promote desorption of carbon dioxide from the working fluid;

transferring the second mixture from the turbine into a low-pressure vessel; and releasing carbon dioxide, desorbed from the working fluid, from the low-pressure vessel for collection.

2. The method of claim 1, further comprising:

accessing an interior temperature of the interior environment;

accessing a target temperature range of the interior environment; and in response to the interior temperature falling below the target temperature range, conveying the working fluid through a heating element configured to transfer heat from the working fluid into the interior environment.

3. The method of claim 2, further comprising, in response to the interior temperature exceeding the target temperature range, conveying the working fluid through a cooling element configured to transfer heat from the working fluid to an exterior environment isolated from the interior environment.

4. The method of claim 2, wherein conveying the working fluid through the heating element in response to the interior temperature falling below the target temperature range comprises conveying the working fluid from the low-pressure vessel and through the heating element in response to the interior temperature falling below the target temperature range.

5. The method of claim 1:

wherein conveying the first mixture through the compressor comprises conveying the first mixture through the compressor mechanically coupled to a driveshaft mechanically coupled to a motor configured to drive the compressor and output thermal energy transferable into the first mixture via the compressor; and wherein conveying the second mixture from the high-pressure vessel through the turbine comprises conveying the second mixture from the high-pressure vessel through the turbine mechanically coupled to the driveshaft and configured to transfer energy extracted from the second mixture into a torque on the driveshaft to rotate the compressor.

6. The method of claim 1:

wherein mixing ambient air with the working fluid to generate the first mixture comprises, during a first time period, mixing ambient air, ingested from the interior environment, with the working fluid to generate the first mixture; and wherein mixing ambient air with the working fluid to generate the first mixture comprises, during a second time period, mixing ambient air, ingested from an exterior environment isolated from the interior environment, with the working fluid to generate the first mixture.

7. The method of claim 6:

wherein mixing ambient air, ingested from the interior environment, with the working fluid during the first time period comprises:

during the first time period, accessing a first current interior temperature of the interior environment measured by a first temperature sensor;

accessing a target temperature range defined for the interior environment; and in response to the first current interior temperature falling outside the target temperature range:

accessing a first current exterior temperature of the exterior environment measured by a second temperature sensor;

calculating a first difference between the first current interior temperature and the first current exterior temperature; and in response to the first difference exceeding a threshold difference, mixing ambient air, ingested from the interior environment, with the working fluid during the first time period; and wherein mixing ambient air, ingested from the exterior environment, with the working fluid during the second time period comprises:

during the second time period, accessing a second current interior temperature of the interior environment measured by the first temperature sensor; and in response to the second current interior temperature falling outside the target temperature range:

accessing a second current exterior temperature of the exterior environment measured by the second temperature sensor;

calculating a second difference between the second current interior temperature and the second current exterior temperature; and in response to the second difference falling below the threshold difference, mixing ambient air, ingested from the exterior environment, with the working fluid during the second time period.

8. The method of claim 6, further comprising, during the first time period:

accessing a carbon dioxide level of the interior environment measured by a carbon dioxide sensor;

accessing a target carbon dioxide level range defined for the interior environment; and in response to the carbon dioxide level falling below the target carbon dioxide range, mixing ambient air, ingested from the exterior environment in replacement of the interior environment, with the working fluid to generate the first mixture and regulate the carbon dioxide level of the interior environment to within the target carbon dioxide level range.

9. The method of claim 1, wherein depositing the first mixture in the high-pressure vessel to generate the exhaust stream and the second mixture comprises depositing the first mixture in the high-pressure vessel, fluidly coupled to the compressor, to pressurize the first mixture to generate the exhaust stream and the second mixture.

10. The method of claim 1:

further comprising:

accessing a current interior temperature of the interior environment measured by a first temperature sensor; and accessing a target temperature range defined for the interior environment; and wherein releasing the exhaust stream from the high-pressure vessel comprises:

in response to the current interior temperature falling below the target temperature range, releasing the exhaust stream from the high-pressure vessel into an exterior environment isolated from the interior environment; and in response to the current interior temperature exceeding the target temperature range, releasing the exhaust stream from the high-pressure vessel into the interior environment.

\* \* \* \* \*